United States Patent Office 3,165,133
Patented Jan. 12, 1965

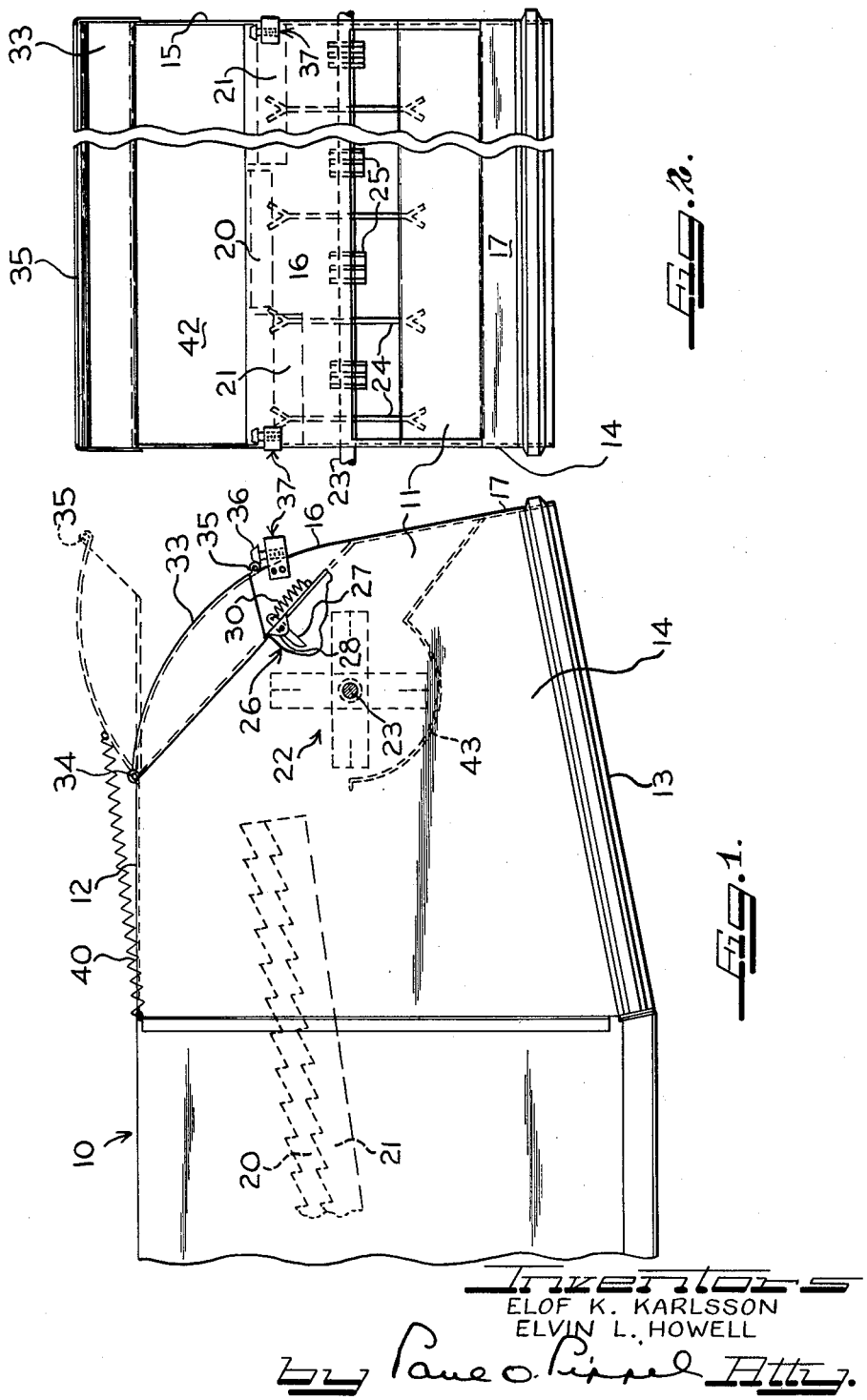

3,165,133
PROTECTIVE STRUCTURE FOR CROP TREATING APPARATUS
Elof K. Karlsson, East Moline, Ill., and Elvin L. Howell, Bettendorf, Iowa, assignors to International Harvester Company, Chicago, Ill., a corporation of New Jersey
Filed Jan. 4, 1962, Ser. No. 164,253
3 Claims. (Cl. 146—117)

The present invention is directed to means for obviating any damage to a crop treating units as the unit itself is subjected to overload conditions, and more particularly to such a protection arrangement as incorporated in a combine adjacent the straw chopper unit.

After the standing grain has been cut and threshed by a combine, the clean grain is deposited in the grain tank while the straw or undesired material is transported rearwardly over the straw walker for discharge through a primary material discharge opening at the rear of the combine. If it is desired to reduce the size of the straw particles discharged onto the ground, a straw chopper unit can be added either at the rear of the combine within the primary discharge chute, or an auxiliary straw chopping apparatus can be attached to a combine with no self-contained chopping unit. It has been found that the chopper is subject to overload under various conditions, for example, if the operator drives the combine too fast and feeds the material at too high a rate into the combine, if he proceeds at a conventional rate of speed but is mowing an unusually heavy stand of grain or picking up an unusually thick windrow, if the drive to the chopper is removed by reason of the belt "jumping" the drive pulleys, or if the drive is reduced by slippage of the belt. Upon the occurrence of any of these conditions, the straw is accumulated in the chute at the rear of the combine over and adjacent the knives of the straw chopper. Such accumulation tends to damage the sheet metal wall portions of the combine by forcing them outwardly, and causes the straw racks to break at the rear crank supports. Although the primary damage is usually to the combine proper, there may also be some damage to the rotor and knives of the straw chopper.

It is, therefore, a primary object of the present invention to provide a protective structure for such crop treating apparatus to obviate damage to the sheet metal wall and top portions of a discharge chute in the apparatus.

Another important object of the invention is to provide such a protective structure which also protects the chopper unit against damage heretofore caused by the accumulation of crop material thereon.

It is a more specific object of the invention to provide an auxiliary means of egress in the discharge chute of a combine adjacent the straw chopper, which auxiliary egress is utilized only when the crop material accumulates to a level at which damage to the combine sheet metal portions and to the chopper unit is possible and/or probable.

The foregoing and other objects are attained, in a preferred embodiment of the invention, by pivotally mounting a hinged door panel at the upper rearward portion of the discharge chute of a combine, adjacent the chopper unit. Spring bias means are provided to assist in pivoting such panel from the closed to the open position, once its pivotal displacement has been initiated. Latch or bias means are also provided in engagement with at least a portion of the panel to maintain same in the normally closed position and thus provide for egress of the straw only past the chopper unit and through the main discharge opening. In accordance with the invention, as the straw material accumulates in the vicinity of the chopper in a volume which endangers the structural integrity of the combine or the continued functioning of the chopper, the retarding force of the latch is overcome and the auxiliary panel is pivoted upwardly to define an auxiliary discharge opening through which the excess portion of the accumulated crop material is passed to obviate the possibility of damage to the combine sheet metal components and to the chopper arrangement.

The best mode contemplated for carrying out the invention will now be described. To enable those skilled in the art to make and use the invention, such description is set forth in connection with the accompanying drawing, in the two figures of which like reference numerals identify like elements, and in which:

FIGURE 1 is a partial side view, with parts broken away, of the rear portion of a combine discharge chute in which an embodiment of the invention has been incorporated; and FIGURE 2 is a rear elevation view of the embodiment depicted in FIGURE 1.

As shown in FIGURES 1 and 2, the rear portion of a combine includes a discharge chute 10 in which a rearward primary material discharge aperture 11 is defined by a plurality of wall panels. More specifically, such panels include a top panel 12, a bottom panel 13, and left and right (as viewed from the rear) side panels 14 and 15. At the rear of discharge chute 10, a middle rear panel 16 and a lower rear panel 17 are disposed as indicated to assist in defining primary opening 11. It is emphasized that the illustrated configuration is of a preferred embodiment only, and many other rearward discharge openings will no doubt be suggested to those skilled in the art. "Rearward" as used herein and in the appended claims, encompasses a material discharge aperture not only in the extreme rear of the discharge chute 10, but also in either of the side rear portions, such as in panels 14 or 15, or in either of the top rear and bottom rear panels. More specifically, "rearward" refers to the disposition of the material discharge apertures at the rear of the combine rather than in any specific location of the discharge chute itself.

Portions of the straw stack or straw walker 20 and 21 are indicated to show the feeding relation of the straw or other crop material toward the chopper unit 22, shown as comprising a shaft 23 on which the various knife units are mounted, with the shaft protruding through and supported in journal fashion in side panels 14 and 15.

Chopper 22 further comprises a plurality of blade elements 24, affixed to the shaft sections 23 which are intercoupled by a plurality of coupling units 25. A plurality of yieldable knife elements 26, one of which is illustrated in FIGURE 1, are positioned to cooperate with the blades 24 of chopper 22. Each yieldable knife unit includes a blade 27 pivoted to a support ear 28, and the upper end of knife 27 is coupled over a bias spring 30 to a fixed point on the discharge chute. Spring or bias unit 30 urges the knife blade 27 into the position illustrated in FIGURE 1, to cooperate with the blade portions of chopper 22 in the comminution of the straw or other crop material passing therethrough. The tension forces applied by spring 30 can be overcome if a rock or other hard material strikes one of the knives 27, to permit the rotation of the knife out of the path of travel of the obstruction and facilitate its prompt return under the urging of spring 30 to the operating position, illustrated in FIGURE 1. Such yieldable knife arrangements, in addition to units such as chopper 22, are now commercially available.

In accordance with the invention, a top rear panel 33 is pivotally mounted as by a pin 34 to the top panel 12 of the discharge chute. Panel 33 is illustrated in the closed position in solid lines in FIGURE 1, and in broken lines the open position of this panel is there illustrated; in FIGURE 2, panel 33 is in the open position. The portion of panel 33 adjacent panel 16 includes a rolled-over lip 35, engaged by plunger 36 of each spring-biased latch unit 37, affixed by rivets or other suitable means to the rear of the discharge chute. One of the latching arrangements is disposed at either side of the rear of the discharge chute. Another bias spring 40 is interconnected between a point on the upper panel 12 and a point on the rotatable or movable panel 33, to assist in the positive displacement of panel 33 once a sufficient force has been applied thereto to overcome the latching tendency of units 37.

*Operation of the Invention*

With ordinary operation of the invention, after the grain has been separated from the straw and chaff in the main portion of the combine (not shown), the straw is passed rearwardly over the straw racks 20 and 21, and down onto the chopper unit 22 which is positioned over the chopper cylinder wrapper 43. The straw is chopped up by the cooperation between the main chopping unit 22 and the yieldable knives 27 in a manner which will be apparent from the drawings. The more finely comminuted material is discharged rearwardly and downwardly through a discharge aperture 11 and spread on the ground behind the combine. With the top rear panel 33 in the closed position, as indicated by the solid line showing of FIGURE 1, there is only one discharge aperture, the main opening 11, and all the chopped material is passed out through this aperture.

In accordance with the inventive teaching, if the combine is driven too rapidly or if some other condition occurs which results in an accumulation of crop material on and in the vicinity of chopper 22, the pressure built up by the accumulated material is directed against panel 33, and when such pressure reaches the level sufficient to overcome the latching force of latch units 37, the top rear panel 33 is rotated slightly from the illustrated solid line position in FIGURE 1. With the initial movement upwardly and rearwardly away from the latching units, the energy stored in spring 40 is released to positively displace panel 33 in its upward and rearward rotative movement to the position illustrated in broken lines in FIGURE 1 and in solid lines in FIGURE 2, thereby defining an auxiliary or secondary material discharge opening 42, best seen in FIGURE 2. The extra accumulation of crop material is thus passed outwardly through the auxiliary discharge opening 42 to reduce the volume of material in the chopper, thereby obviating any damage to the combine itself or to the chopper by reason of the large accumulation of straw or other crop material. After such overload condition has been corrected by the slowing of the combine or other means, the operator can close the panel 33 and thus insure that all the material passing from the straw walkers 20 and 21 passes through the chopper 22 and knives 27 and out the primary discharge opening 11.

Although only a particular embodiment of the invention has been described and illustrated, it is apparent that modifications and alterations may be made therein, and it is the intention in the appended claims to cover all such modifications and alterations as may fall within the true spirit and scope of the invention.

What is claimed is:

1. In a combine of the type comprising a housing having upper, side, lower and rear portions defining a rearward material discharge opening, a straw chopper unit mounted internally of said housing comprising, means in said side portions defining a pair of oppositely spaced bearing openings, a shaft journaled in said bearing openings substantially transversely of said discharge opening, knife means affixed to said shaft for concomitant rotation therewith in the treatment of crop material and blade means mounted on a segment of said rear portion such that they cooperate with said knife means to chop the straw, and wherein the improvement comprises coupling means for pivotally mounting at least a segment of one of said housing portions with respect to the remainder of said portions in an area adjacent the knife and shaft arrangement, said segment of one of said housing portions being above and separate from the segment of the rear portion upon which said blade means are mounted, and bias means for maintaining said segment of one of said housing portions in a normally closed position to define with the other housing portions the material discharge opening, said segment being yieldable under the pressure of a large volume of crop material to effect opening of said segment of one of said housing portions and consequent discharge of said crop material therethrough.

2. In a combine of the type having a housing including a plurality of wall portions defining a rearward primary material discharge opening, a straw chopper apparatus mounted within said housing adjacent said primary material discharge opening, mounting means affixed to said housing and to one of said wall portions to provide for displacement of one of said portions from a first position in which said wall portion comprises a portion of said housing to a second position in which said wall portion effectively defines at least a portion of a secondary material discharge opening, and latch means for maintaining said one wall portion in said first position as a normal volume of material passes through said chopper apparatus and through said primary discharge opening, said latch means being yieldable under pressure developed as the crop material accumulates to effect the displacement of said one wall portion from the first to the second position to provide for the discharge of the accumulated material through said secondary discharge opening, thereby preventing damage to the housing and to the chopper apparatus.

3. For use with a crop treating unit in which a chopper is disposed transversely of a discharge chute for shredding crop material passed from a first point ahead of said chopper to a primary discharge opening beyond said chopper, the improvement which comprises: a wall panel disposed ahead of said chopper and normally retained in a closed position to comprise a portion of said housing and direct the flow of crop material through said primary discharge opening; means for pivotally mounting said panel to provide for the arcuate displacement thereof from the closed position to an open position in which said panel, together with adjacent portions of the housing, defines an auxiliary discharge opening; and spring-biased latch means, affixed to said housing adjacent the pivoted panel, positioned to normally retain said panel in the closed position to provide for discharge of material only through said primary discharge opening, and displaceable to the open position responsive to the accumulation of crop material adjacent said chopper to provide for the discharge of the excess accumulated crop material through said auxiliary opening, thereby obviating damage to the discharge chute and to the chopper.

References Cited in the file of this patent

UNITED STATES PATENTS

| | | |
|---|---|---|
| 336,400 | Ellis | Feb. 16, 1886 |
| 2,187,957 | Urschel | Jan. 23, 1940 |
| 2,298,830 | McGillis | Oct. 13, 1942 |
| 2,842,175 | Thompson | July 8, 1958 |
| 2,858,867 | Elofson | Nov. 4, 1958 |
| 2,862,536 | Gronberg | Dec. 2, 1958 |